United States Patent [19]

White

[11] Patent Number: 4,630,201
[45] Date of Patent: Dec. 16, 1986

[54] ON-LINE AND OFF-LINE TRANSACTION SECURITY SYSTEM USING A CODE GENERATED FROM A TRANSATION PARAMETER AND A RANDOM NUMBER

[75] Inventor: Peter White, Berkeley, Calif.

[73] Assignee: International Security Note & Computer Corporation, Panama City, Panama

[21] Appl. No.: 580,003

[22] Filed: Feb. 14, 1984

[51] Int. Cl.[4] ............................ G06F 15/30; G06F 7/58; H04L 9/02

[52] U.S. Cl. .................................... 364/408; 235/379; 235/380; 178/22.08; 178/22.15; 364/717; 340/825.34

[58] Field of Search ................ 364/408, 406, 200, 900, 364/117; 235/375, 379, 382, 380; 178/22.08, 22.09, 22.15; 340/825.34

[56] References Cited

U.S. PATENT DOCUMENTS

| | | | |
|---|---|---|---|
| 3,703,727 | 11/1972 | Knowlton | 364/717 X |
| 3,792,446 | 2/1974 | McFiggins et al. | 364/900 |
| 3,862,716 | 1/1975 | Black et al. | 235/381 |
| 4,001,550 | 1/1977 | Schatz | 235/379 X |
| 4,023,013 | 5/1977 | Kinker | 235/379 |
| 4,025,760 | 5/1977 | Trenkamp | 364/408 X |
| 4,053,735 | 10/1977 | Foudos | 235/419 |
| 4,097,923 | 6/1978 | Eckert, Jr. et al. | 364/900 |
| 4,109,238 | 8/1978 | Creekmore | 235/379 |
| 4,114,027 | 9/1978 | Slater et al. | 235/379 |
| 4,234,932 | 11/1980 | Gorgens | 364/408 X |
| 4,271,482 | 6/1981 | Giraud | 235/375 X |
| 4,302,810 | 11/1981 | Bouricius et al. | 364/200 |
| 4,310,720 | 1/1982 | Check, Jr. | 178/22.08 |
| 4,321,672 | 3/1982 | Braun et al. | 364/408 |
| 4,341,951 | 7/1982 | Benton | 364/406 X |
| 4,353,064 | 10/1982 | Stamm | 235/382 X |
| 4,386,266 | 5/1983 | Chesarek | 235/380 |
| 4,396,914 | 8/1983 | Aston | 235/382 X |
| 4,423,287 | 12/1983 | Zeidler | 178/22.08 |
| 4,471,216 | 9/1984 | Herve | 235/379 X |
| 4,529,870 | 7/1985 | Chaum | 235/380 |

FOREIGN PATENT DOCUMENTS

2080203 2/1982 United Kingdom ................ 364/409

Primary Examiner—Jerry Smith
Assistant Examiner—Clark A. Jablon
Attorney, Agent, or Firm—Limbach, Limbach & Sutton

[57] ABSTRACT

A security system is disclosed for use in an electronic funds transfer environment. The system includes a central processor and a portable transaction device. During initiation, the central processor generates a sequence of transaction numbers and associated random numbers. This data is supplied to and stored in the portable transaction device. In operation, the next available random number is determined and combined with a transaction parameter to generate a security code. The security code may be verified immediately or during the check clearing cycle at the central processor. In the preferred embodiment, in the on-line operation, the selection of the ramdom number is altered by a random offset number further enhancing security.

17 Claims, 5 Drawing Figures

FIG._1_.

ON-LINE AND OFF-LINE TRANSACTION SECURITY SYSTEM USING A CODE GENERATED FROM A TRANSATION PARAMETER AND A RANDOM NUMBER

TECHNICAL FIELD

The subject invention relates to a new and improved system and method for improving security in a funds transfer environment. The security system is suitable for both on-line and off-line operation and is particularly adapted to promote security in an off-line check writing situation.

BACKGROUND ART

In today's society, there is great interest in developing electronic fund transfer systems. Predictions for the future include the total elimination of both cash and checks, with all fund transfers being performed electronically.

However, the time when all transactions are carried out electronically is still a long way off. To accomplish this goal, all vendors would have to be linked through a common communication network including banks, credit houses and other financial institutions. Many major hurdles must be overcome, such as incompatible technologies and security systems as well as competing communication networks. These difficulties will prevent full scale electronic funds transfer systems from being implemented for quite some time.

Accordingly, in the near future, customers will utilize both cash and checks for purchasing goods. While full scale electronic funds transfer is not yet possible, the new technologies can be utilized to improve the security and efficiency of the more traditional money exchange techniques. The subject invention is particularly directed towards improvements in check writing and provides greater security and reliability.

The check writing and clearing system of banks is quite well known and need not be described in detail. Briefly, a customer typically establishes an account at a bank upon which checks can be drawn. When a customer (drawer) wants to pay for goods or services at a merchant, a check is written out to the merchant. The check includes the name of the merchant (payee), the transaction amount, the date and the signature of the drawer. The payee then deposits the check in his bank which then passes the check through a national clearing house. The clearing house then transfers the check to the drawer's bank so that his account can be debited.

There are some drawbacks to this check clearing cycle. For example, when the check comes to the drawer's bank, a significant amount of human handling is necessary to clear the check, including authentication of signature, and data input of the transaction amount. There is much effort being made to develop systems which reduce the need for human handling. One example can be found in U.S. Pat. No. 4,417,136, issued Nov. 22, 1983 to Rushby. In the latter device, deposit and withdrawal slips are printed with machine readable indicia.

There are other problems associated with the use of checks. For example, merchants are frequently leery of accepting checks from customers whom they do not know. To overcome the latter shortcoming, the banking community has developed a system wherein a check can be "certified". In this case, the customer will go to the bank and have funds immediately withdrawn from his account to cover the amount of the check. In this manner, the payee knows that upon receipt, funds are reserved and available to him at the bank.

In the prior art, developments have been made to automate the issuance of certified checks. For example, in U.S. Pat. No. 4,385,285, issued May 24, 1983, to Horst, a check dispensing terminal is disclosed which is connected on-line to the customer's bank. When the customer wishes to write a certified check, the funds are automaticaly debited to the account and a certified check is printed. However, the latter system requires that the customer go to the bank and operate a check issuing device which is connected on-line to the bank's central processor. The prior art does not disclose any system for writing a certified check away from the bank or at a time when the bank's computer system is not operational. Therefore, it would be desirable to develop a system where certified, secured checks can be written without connection to the bank.

The latter approach, where funds transfers can take place in an off-line manner, has been made possible through the development of so-called smart cards. As used herein, a smart card is intended to mean a portable transaction device which has an electronic memory for storing transaction information.

Examples of such smart cards can be found in U.S. Pat. Nos. 4,102,493, issued July 25, 1978 and 4,092,524, issued May 30, 1978, both to Moreno. In these patents, bankcards are defined having microprocessing capability and electronic storage. These cards can be used to store information, such as an account number, account balance and a secret password.

Another example of an electronic portable device can be found in U.S. Pat. No. 4,341,951 to Benton, issued July 27, 1982. The latter patent discloses a portable electronic device which is connectable to a bank card. The bank card is capable of holding information such as an account balance. In Benton, the microprocessor functions are carried out in the portable device rather than in the bank card itself. The subject invention is intended to take advantage of these emerging technologies where microprocessors and storage devices are extremely compact and can operate independently of the central processing unit of a banking system.

From the foregoing, it can be appreciated that a significant amount of electronic hardware and software has been developed to enable the construction of off-line electronic systems. However, to date, there has been no system developed which effectively combines the techniques of drafting certified checks and funds transfers in an off-line manner. Such a system must be capable of ensuring the authenticity of the certified check so that it can be readily accepted by a merchant.

Accordingly, it is an object of the subject invention to provide a new and improved system for handling fund transfers in a secure manner.

It is another object of the subject invention to provide a new and improved system capable of generating certified checks.

It is a further object of the subject invention to provide a new and improved system wherein transactions can be carried out in an off-line manner and be subject to later verification at a central processing unit.

It is still another object of the subject invention to provide a new and improved transaction system which may also be operated in an on-line manner.

It is still another object of the subject invention to provide a new and improved funds transfer system wherein the security of on-line transactions is further enhanced.

DISCLOSURE OF THE INVENTION

In accordance with these and many other objects, the subject invention provides for a system which includes a central processor and a portable transaction device. The portable transaction device includes a memory and microprocessing capabilities. The particular hardware configuration of the portable device will depend on size and portability requirements. For example, the transaction device may be defined by a single unit or consist of separate components, such as a bank card type device in combination with a transactor/printer. The transactor/printer may be carried by the customer or supplied to the merchants.

In accordance with the subject invention, the central processor is capable of generating a table of random numbers which are associated with a sequence of transaction numbers. In the illustrated embodiment, the sequence of transaction numbers are equivalent to successive check numbers. The set of random numbers and the associated check numbers are supplied to the storage means at the portable transaction device.

In operation, when a check is to be written, the customer enters into the transaction device at least one parameter associated with the transaction, preferably the transaction amount. The transaction device determines the random number associated with the next available check number and combines data representative of that random number with the transaction amount. The combination can include any suitable known algorithmic encryption technique.

The resulting output defines a security code which is associated with the check. The security code is either handwritten or printed on the check. When the check reaches the bank, its authenticity is verified by the central processor. Verification is accomplished by determining the check number and transaction amount and generating the security code. The security code is generated utilizing the table of random numbers stored in the central processor in the same manner that the task was carried out in the portable transaction device. If the security codes match, the check can be approved.

In the preferred embodiment, the portable security device also stores an account balance. The transaction amount entered by the customer will be immediately debited from the balance. If there are insufficient funds available, the check will not be written.

The subject system provides added security for the merchant by permitting the merchant to verify the authenticity and value of the check at the time it is presented. To carry out this verification, the merchant can contact the bank and relay the check number, transaction amount and security code. The bank can immediately verify the security code for the merchant thereby guaranteeing the check.

The subject system has also been designed to operate in an on-line mode. The portable transaction device can therefore be used to withdraw cash, traveller's checks or receive money transfers from the bank into the account balance stored in the card.

In the preferred embodiment an enhanced security system is provided for on-line transactions. More specifically, during the on-line transaction, the central processing unit generates a random offset number which causes a pointer in the table of random numbers to be randomly incremented. This randomizing step can occur either before or after the completion of the transaction in progress. In either case, since the pointer for the random number table has been incremented by a random amount, future transactions in the off-line mode will utilize random numbers which are different from the numbers originally assigned to the checks. In this manner, should a criminal obtain access to the customer's table of random numbers, the latter added security feature inhibits the counterfeiting of a transaction. More particularly, even though the original table of random numbers is assigned to specific transactions, the random offset feature prevents a criminal from determining the current random number required to generate the necessary security code.

Further objects and advantages of the subject invention will become apparent from the following detailed description taken in conjunction with the drawings in which:

BRIEF DESCRIPTION OF THE DRAWINGS

FIG. 2 is a flow chart illustrating the steps which are carried out in the off-line operation of the subject system wherein

FIG. 3 is a flow chart illustrating the steps carried out in the on-line operation of the subject system wherein

BEST MODE FOR CARRYING OUT THE INVENTION

Figure 1:
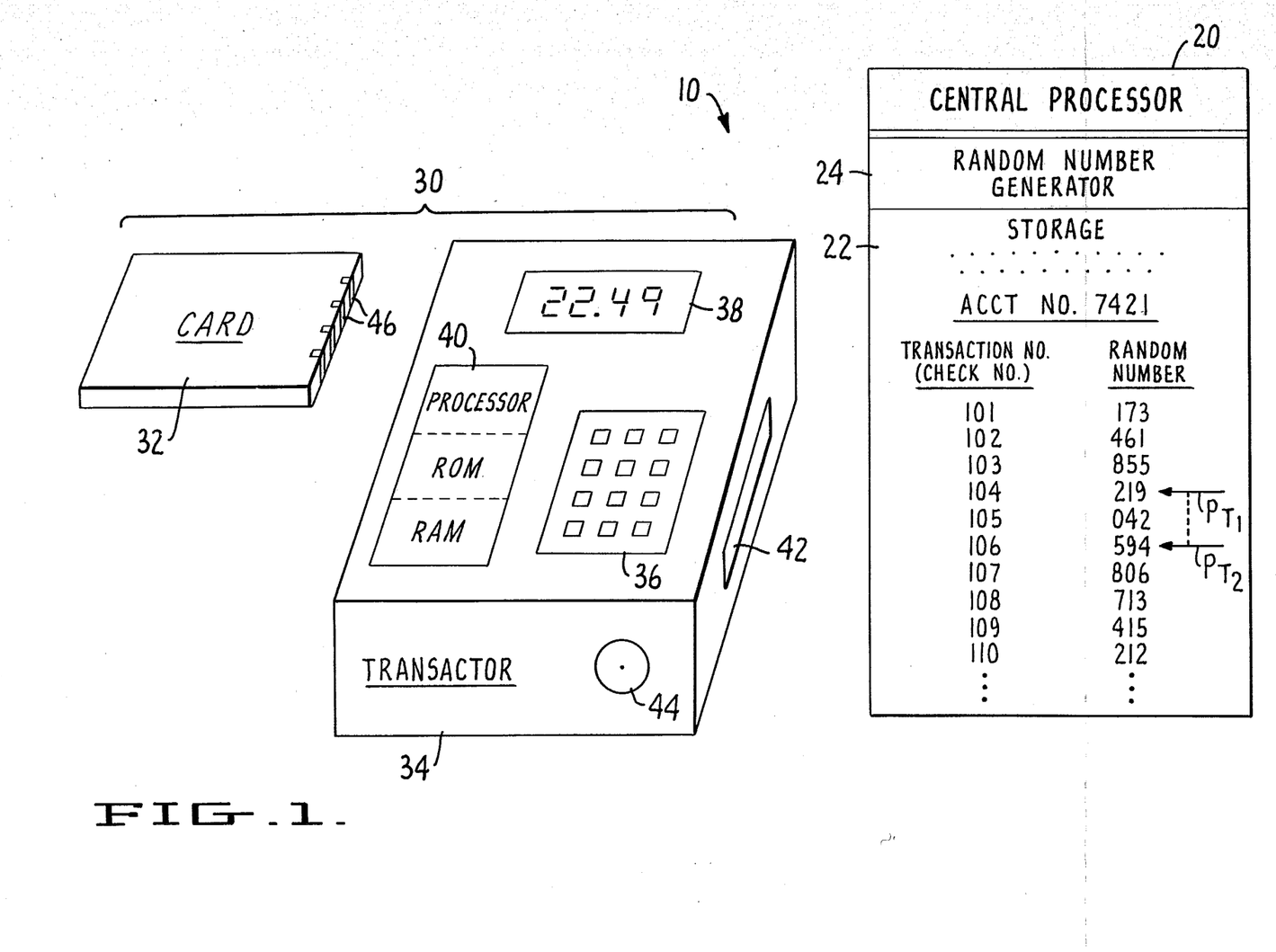
FIG. 1 is a schematic diagram of the components of the system of the subject invention.

Referring to FIG. 1, there is illustrated a schematic diagram of the elements of the system 10 of the subject invention. The system 10 includes a central processor 20 which is typically located at the bank data center. The bank data center will have full computer processing facilities including sufficient storage to keep track of the tables associated with various cardholders' accounts. Illustrated at 22 is the type of table which would be developed for each cardholder's account. The details of table 22 will be discussed more fully hereinbelow. The central processor 20 also includes a random number generator 24 for generating random numbers and offset numbers also discussed below.

The subject system further includes a portable transaction device shown generally at 30. In the preferred embodiment, the transaction device consists of two elements, a memory card 32 and a transactor 34. The two part structure of the portable transaction device illustrated herein is intended to afford maximum portability and convenience. The prior art contains many other examples of suitable portable intelligent devices. In some cases, the portable transaction device can be defined by a single operating unit. The scope of the subject invention is intended to cover any hardware implementation having the features discussed below.

In the illustrated embodiment, card 32 is defined by a memory card having a battery augmented memory or BAM. Card 32 preferably includes a low power CMOS (complementary metal oxide semiconductor) random axis memory powered by a battery. Card 32 is capable of storing financial information, such as the account number of the customer, his address, the name of the financial institution, an account balance and a secret password. If the customer is issued only the card, and not the transactor 34, the card should be provided with sufficient storage to contain a table similar to table 22 located at the central processor. A memory suitable for the subject card is commercially available as Hitachi part No. HM 6167.

Alternatively, the memory card 32 may be defined by an electrically alterable read-only memory (EAROM) or an electronically eraseable programmable read-only memory (EEPROM). Both of the latter memory systems provide for the storage of financial information and do not require batteries to retain the information. One specific advantage of using a battery augmented memory is that it can be designed such that tampering will cause a power loss, resulting in the contents being destroyed, thereby reducing the likelihood of fraudulent use.

In the preferred embodiment, transactor 34 includes a key pad 36 for entering transaction parameters including transaction amount, transaction number, payee, etc. Preferably, transactor 34 also is provided with a display 38 to permit the visualization of entered data and to display other security information as described below. Transactor 34 is provided with a microprocessor 40 including a suitable random access memory RAM and a read-only memory ROM, preferably resident on a single integrated circuit chip. The ROM is suitable for containing all the processing instructions necessary to carry out the functions described with reference to FIGS. 2 and 3. A suitable processor 40 is commercially available in a CMOS version of the Intel 8048 family. In the situation where the customer is issued a transactor 34, an additional memory, such as used in card 32, will be provided to hold the information in table 22. In contrast, in a system where transactors are distributed only to merchants, the table information will be stored in card 32.

Transactor 34 preferably includes a means 42 for receiving a check. When a check is inserted into opening 42, various security information can be imprinted thereon. In addition, other information can be imprinted, such as the payee name and the transaction amount. It is envisioned that the check printing features of the transactor 34 may also be modularized and removably connectable to the transactor. It is also possible to store a supply of checks in the transactor to be fed through and issued automatically, as needed.

Transactor 34 also includes an input/output port 44 to permit an on-line connection with the central processor. In the normal checkwriting situation of the subject system an on-line connection is unnecessary. However, when the transactor includes the capability to dispense cash or travellers checks, an on-line connection will be necessary. Similarly, an on-line connection is necessary when funds are transferred from the bank to replenish the account balance in the card.

Transactor 34 is also provided with a slot (not shown) for receiving card 32. Card 32 may be provided with electrically conductive contact elements 46 for establishing communication between the card 32 and transactor 34. Any other suitable connecting means may be utilized.

As can be appreciated, the individual hardware elements so far discussed are all available in various forms in the prior art. However, at the present time, there has been no system developed which combines these devices to permit the printing of a secured, certified check in an off-line manner. This shortcoming is overcome in the system of the subject invention.

In order to initialize the system of the subject invention, the central processor first generates a table associated with each account number. Referring to FIG. 1, an exemplary table 22 is shown for hypothetical account number 7421. The left-hand column of table 22 represents a list of successive transaction numbers. In the preferred embodiment of the subject invention, these transaction numbers are successive check numbers.

It may be desirable to extend the subject system for use in other types of off-line transactions, for example, mail order situations. In the latter case, the transaction numbers would represent successive purchases. If multiple off-line functions are desired separate tables may be set up for each type of off-line transaction. In the alternative, a single table may be used with transaction numbers being associated with each successive transaction, whether it is a check or mail order transaction. For simplicity and clarity, the off-line transactions illustrated herein will be limited to checkwriting and the transaction numbers will be considered to be check numbers.

After the check numbers have been generated in the table, the random number generator 24 of the central processor generates a list of numbers associated with each of the successive transaction numbers. These random numbers will be used to generate security codes as described more fully hereinbelow.

The next step in implementing the system of the subject invention is to supply the portable transaction device 30 with the information in table 22. As pointed out above, this information can be supplied either to the transactor 34 or the memory card 32. Even though the table may be rather lengthy, it is believed that present memories are sufficiently compact so that all the information could be stored in the memory card 32. The data in the table is loaded into the card in an on-line manner, preferably at the bank, to insure maximum security. At this time, an initial account balance can also be transferred and stored in the card. Finally, the customer can be assigned a password which is also stored in the card.

Figure 2A:
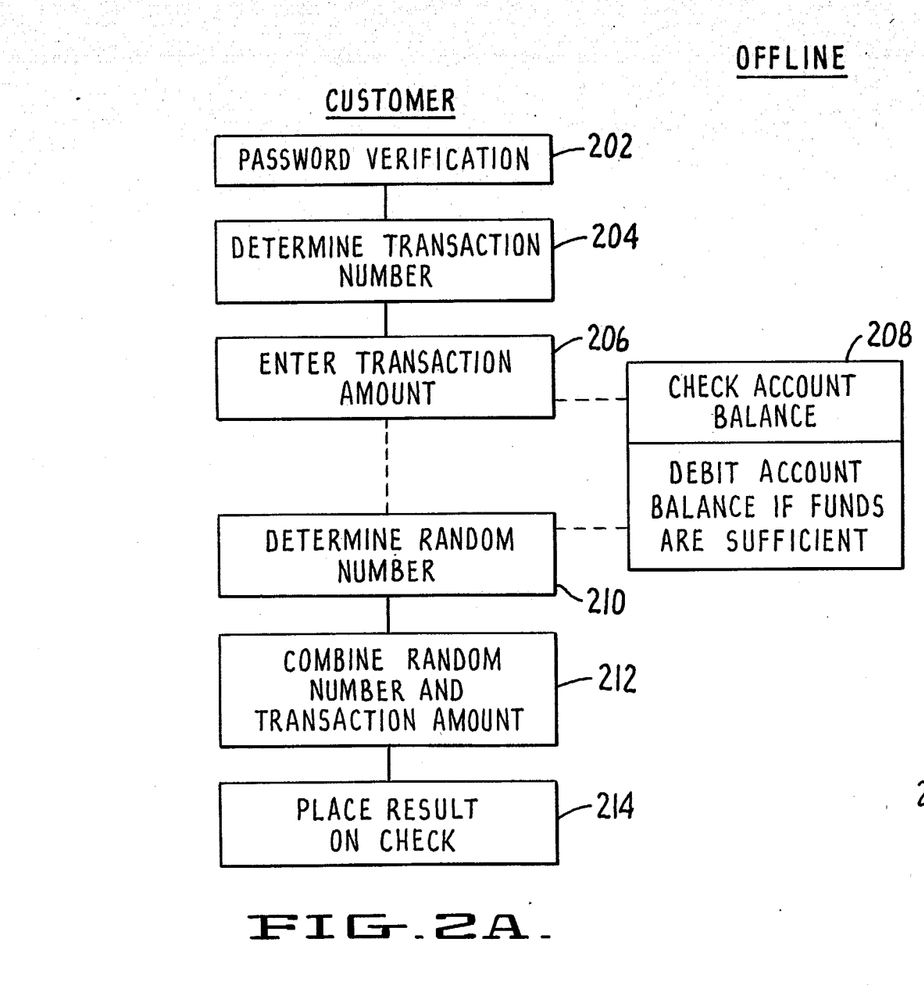
FIG. 2A illustrates steps occurring at the customer location and FIG. 2B illustrates subsequent steps taken at the central processor.

Once the system has been initialized as described above, it can be operated in a manner to issue certified checks in an off-line manner. Referring to FIG. 2A, the steps to be carried out are depicted. In the illustrated embodiment, it is assumed that the transactor 34 is a separate unit supplied to the merchant.

When making a purchase, the customer would first insert the memory card 32 into the transactor 34, establishing an electrical interconnection between the two units. If the card has been provided with a password system, the user will enter the digits of the password into key pad 36. Transactor 34 will read the password stored in the memory card and compare it with the password entered by the user. If the password is verified 202, the transaction can continue.

The use of a password is desirable to prevent an unauthorized person from operating a lost or stolen card. Obviously, a criminal having obtained a lost or stolen card would not know the password and therefore could not activate the system. The use of a password or a personal identification number (PIN) in conjunction with bankcard systems is well known in the art, particularly with respect to automatic teller machines (ATM's) and need not be described herein.

After the password has been verified, the next available transaction number must be determined in step 204. Presumably, the next transaction number will correspond to the next available check in the checkbook. In the illustrated embodiment, the card will keep track of the next transaction number. Alternatively, the customer can enter the next transaction number.

Thereafter, the customer will enter at least one transaction parameter 206. In the preferred embodiment, the transaction parameter is the value or amount of the transaction. The advantage of entering the transaction amount is that it represents a numerical variable dependent only on the particular purchase being made. In addition, where the card has an account balance, this transaction amount can be directly debited.

FIG. 2A depicts an optional step 208. Where the card is provided with an internal account balance, the transaction amount is first compared with that account balance. If the amount in the stored account balance is sufficient to cover the check, the account balance is debited and the transaction is allowed to proceed. However, if the account balance is insufficient, the transaction will be halted. The customer will be required to transfer funds from his bank account to the bankcard 32 in an on-line manner prior to consummating the transaction, as discussed with reference to FIG. 3.

Assuming that the account balance was sufficient and the account was debited, the security code for the check will then be calculated. The first step in generating a security code is to determine the random number associated with the check to be written in step 210. Assuming this is the first check being written (No. 101), reference to exemplary table 22 of FIG. 1 will show that the random number assigned to check No. 101 is "173".

Once the random number is determined, it is combined with the transaction amount to produce a security code at step 212. The combination of the random number and the transaction amount can be accomplished by any well known algorithmic encryption technique. The subject invention is not intended to be limited by the particular algorithmic combination selected.

The resulting security code is then placed on the check at step 214. In the preferred embodiment, where a printer is provided, the security code can be directly imprinted on the check. Alternatively, the security code can be generated in the display window 38 and the customer can write the security code onto the check.

If the transactor 34 is provided with a printer, it would be preferable to use a character font and technique which is machine-readable, such as the magnetic ink format (MICR). The locations and format of this type of printing can be found in ANSI specifications X3.2-1970 (R1976) and X3.3-1970 (R1976). In addition, other printing can be utilized, such as optical bar codes. The check printer can also be utilized to imprint the name of the payee and the transaction amount which have been entered through keypad 40. Check printing devices having these capabilities are well known in the art and need not be described herein.

Figure 2B:
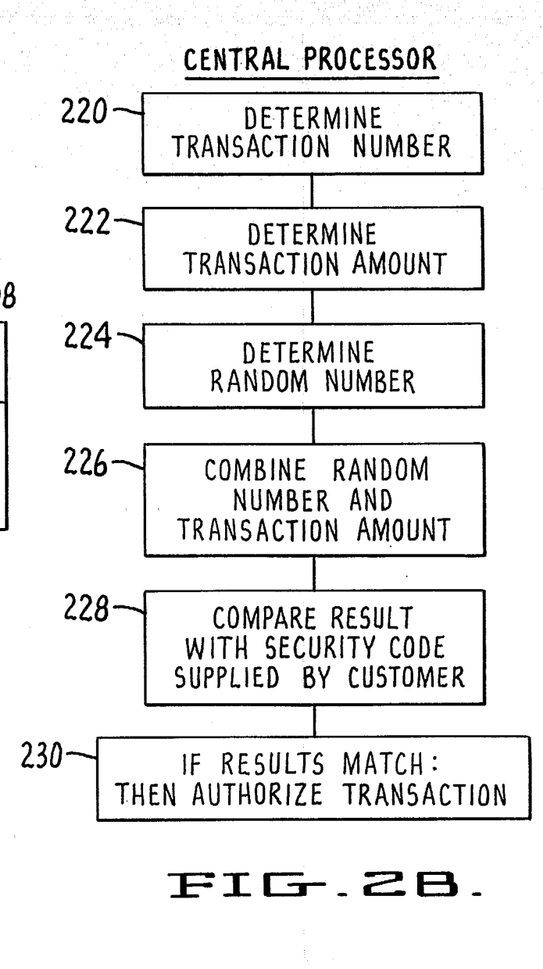

Referring to FIG. 2B, the steps taken at the bank when the check is received are illustrated. More particularly, in order to authenticate the check, the bank will first read the transaction number or check number 220. The transaction amount is then read from the check 222. The next step is to determine the random number associated with the check 224. The random number is determined by addressing table 22 using the check number. The transaction amount and random number are then combined at step 226 to generate a security code using the same algorithmic method as utilized by the transactor 34 at step 212. The resulting security code is then compared at 228 with the security code printed on the check. If these codes match, the transaction can be authorized and the check paid 230. Furthermore, the check number and associated security code will either be erased, or flagged in some manner such that duplicate checks cannot be authorized.

The subject system has another advantage in that the merchant may instantaneously verify the authenticity and value of the check by contacting the bank. More particularly, the merchant can contact the bank, for example, by telephone and relay the necessary transaction parameters including the check number, transaction amount and the security code generated by the transactor 34. The bank will then perform steps 224 through 226 (as outlined above) to independently generate a security code. If the security codes match as in step 228, the bank can assure the merchant that the check is valid and that sufficient funds are available. In this case, the bank will flag the check number so it may not be used again.

In some cases a customer may wish to cancel an issued check. For example, he may want to stop a purchase after the check is written. The customer would then contact the bank and relay the check number, amount and security code. The bank can then delete or flag that transaction. The account balance in the card can be restored through an on-line procedure discussed immediately below.

Figure 3A:
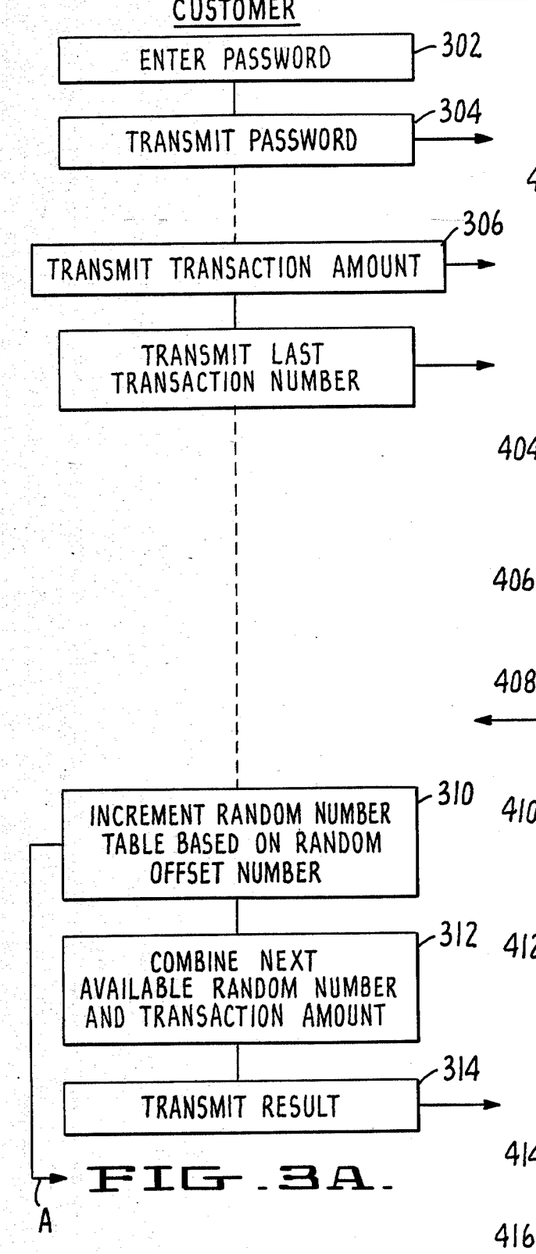
FIG. 3A illustrates steps occurring at the customer location and FIG. 3B illustrates steps taken at the central processor.
Figure 3B:
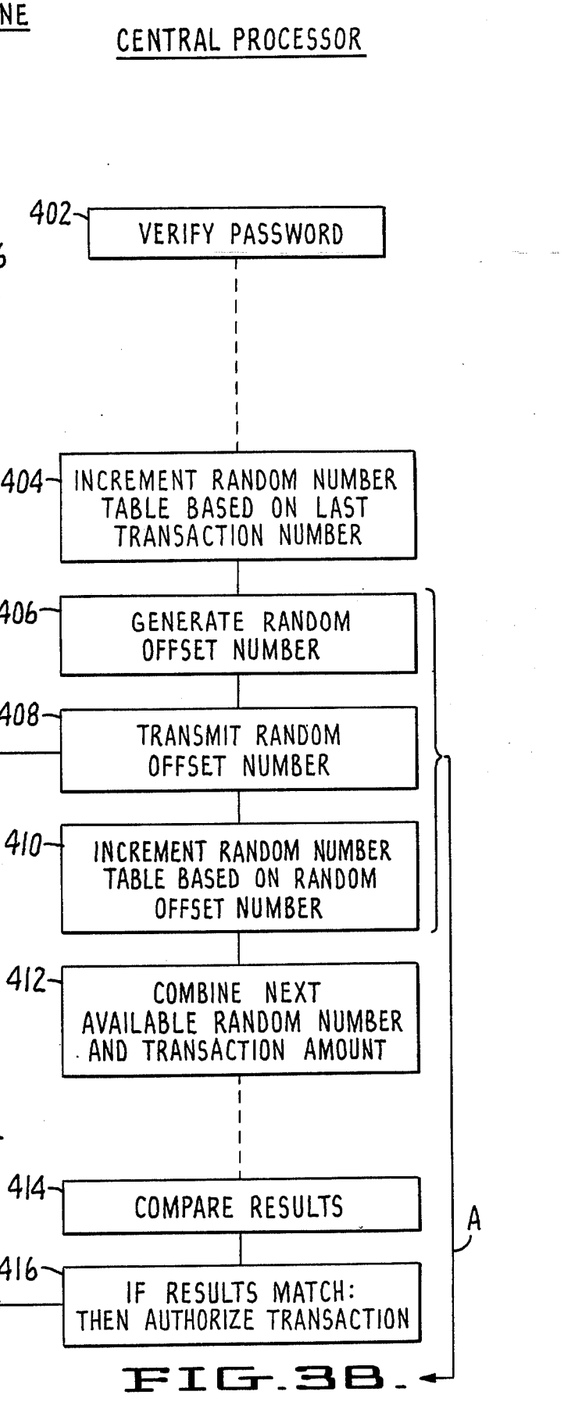

Referring now to FIGS. 3A and 3B, the operation of the subject system in an on-line mode will be discussed. It should be noted that if the merchant is connected directly to the central processor, check writing can also be carried out in a similar on-line mode. Typically, however, the on-line actions are more likely to include withdrawals of cash or travelers check from an automatic teller machine. Another on-line activity is the transfer of funds from the bank to the memory card 32 if the account balance need to be replenished.

Since the actions by the customer and the central processor are interactive, the flow chart of FIG. 3 is drawn to illustrate an example of the relative timing of each of the steps that are implemented. Other variations are possible and will be discussed. As will be seen below, in the on-line situation, an additional feature is provided which enhances security in the on-line mode and has the effect of enhancing security of the overall system.

The initiation of an on-line transaction is similar to the off-line mode where the customer enters a password 302 into the key pad 36 of the transaction. In this case, the transactor 34 is connected by port 44 to the central processor. Depending on the type of transactor, the interconnection can be accomplished in a variety of other ways including through telephone lines and modems. In the alternative, a voice connection in combination with a keypad data entry means (such as a telephone dial pad) may be used. Various encryption systems may be used to scramble the transmitted data such that it cannot be intercepted and utilized to attack the system. Encryption communication systems are well known in the art.

Once the password is entered, it is transmitted, preferably in encrypted form, to the central processor 304. The central processor will then verify the password 402 against the account number of the customer. If the password is verified the transaction can continue. In the alternative, where the card and transactor are separate elements, the password may be verified at the transactor in an off-line manner, as discussed above.

The next step in the sequence is to supply the central processor with a transaction parameter such as the transaction amount 306. The customer will then transmit the last used transaction number 308. The central processor must be supplied with the last used transaction number in order to properly access the table of random numbers. As can be appreciated, if the customer has written a number of checks since the last contact with the bank, a number of random numbers will have been used up in the generation of associated security codes. If these checks have not cleared through the bank, the central processor will not be synchronized and could not determine the next available random number. However, if the last check number is known, the pointer in the table can be incremented and synchronized to obtain the next available random number. Available random numbers in the table can be tracked using a simple pointer system well known in the processing art.

In the basic embodiment of the subject invention, the next available random number is used to generate the security code. However, as discussed immediately below, an additional feature is added in the on-line approach which functions to scramble the random numbers.

In one embodiment of the subject invention, after receipt of the last transaction number, the random number table is incremented at step 404. For example, referring to the table 22 of FIG. 1, if the customer indicates that the last check written was number 103, a pointer P will be incremented to the next successive available random number 219.

Rather than using this next available random number to generate a security code, in the preferred embodiment, the central processor will first generate a random offset number at step 406. The offset number represents a number of units by which the pointer in the random number table will be incremented. Typically, the offset number will be between zero and three, since the incrementing of the pointer will cause unused random numbers to be skipped. The use of high value offset numbers would result in many random numbers being skipped, such that the storage requirements for the random number table would increase dramatically. However, since the intent of the offset numbers is merely to add a level of uncertainty as to the next random number to be utilized, a small number of possibilities is considered sufficient. For illustrative purposes, consider that the random offset number generated at step 406 is "2". In this case, the pointer P in the table will be incremented two positions (at time $T_2$) to arrive at the random number 594 in step 410.

As indicated in FIG. 3B, after the offset number is generated, it is also transmitted to the transactor 34 at 408. The pointer in table at the transactor is incremented at step 310 in the same manner as discussed above with reference to the central processor. In the next step, the random number (i.e. 594) is combined with the transaction amount to generate the security code. This algorithmic combination is carried out simultaneously both at the transactor 34 and at the central processor in steps 312 and 412.

Once the security code has been calculated, the transactor will transmit the result at step 314 to the central processor. The security code received from the transactor will then be compared with the security code calculated at the central processor at step 414. If the security codes match, the transaction can be authorized at 416. For example, if the customer is trying to replenish his account balance, funds will be transferred from the user's account at the central processor into the storage of the card. Alternatively, funds could be debited from the card and an equal amount of cash or traveler's checks will be dispensed from the transactor.

The illustrated concept of utilizing a random number in combination with a transaction amount to generate a security code provides a level of safety against attacks of the system. The additional feature of utilizing a random offset number in an on-line transaction adds another level of security. For example, although unlikely, it could be envisioned that with inside information, a criminal could obtain the table of random numbers assigned to a particular user's account. The thief would then fabricate a counterfeit card. The criminal could then write a check and match up the random number assigned to that check, permitting the calculation of the proper security code.

However, the on-line offset approach of the subject invention eliminates this possibility. More particularly, each time an on-line transaction takes place, the pointer in the table is shifted by action of the authorized user, such that the check numbers no longer match the original security codes. In the illustrated example discussed above, when the next check 104 is to be written, the pointer indicates that the next available random number is 806. Therefore, even though the transaction is in an off-line mode, the random numbers have been scrambled to an extent that a criminal having access to the table would not be able to assign the proper security code to check and circumvent the verification system.

There are a number of variations to the timing sequence and verification steps illustrated in FIG. 3 of the drawings which are compatible with the subject invention. For example, the generation, transmission and use of an offset number can be delayed until the transaction taking place is completed. As illustrated by arrows A in FIGS. 3A and 3B, after the random number table has been incremented based on the last transaction number at step 404, the security codes can be calculated immediately. The security codes can then be verified and the transaction authorized. At this point in time, the central processing unit can function to generate the random offset number (step 406) and transmit that random number to the portable transaction device (step 408). The random number tables will then be incremented in accordance with the random offset number. When the steps in the subject method are carried out in the above-described order, the transaction in progress will not be affected, however, the random number table will be altered for future transactions.

In another variation of the subject system, the verification of the security code may take place at the portable transaction device, rather than at the central processor. In one possible scenario, a user might desire to increase his account balance stored in the memory card 32. A telephone and key pad connection could be made to a remote bank. The customer will request a transfer of funds from his bank account into the card. The bank will then calculate a security code based on the next transaction number and the transfer amount. The security code will then be communicated verbally, over the phone, to the customer for entry into the transactor 34.

If the security code calculated by the transactor matches the security code entered by the customer, the account balance in the card will be credited the desired amount.

As discussed briefly above, if other off-line transactions are desired, separate tables could be developed for each type of transaction. In the alternative, a single table could be developed with the customer merely keeping track of successive transactions. Thus, transaction 104 could be a mail order, transaction 105 could be a check, etc. Preferably, the memory card is also capable of keeping a record in memory of all transactions. By this arrangement, a statement could be printed out by the transactor which can be compared with the statement issued by the bank. In this manner, additional safeguards are provided.

In summary, there has been provided a new and improved security system for use in an electronic funds transfer environment. The system includes a central processor and a portable transaction device. During initiation, the central processor generates a sequence of transaction numbers and associated random numbers. This data is supplied to and stored in the portable transaction device. In operation, the next available random number is determined and combined with a transaction parameter to generate a security code. The security code may be verified immediately or during the check or transaction clearing cycle at the central processor. In the preferred embodiment, in the on-line operation, the selection of the random number is altered by a random offset number further enhancing security.

While the subject invention has been described with reference to the preferred embodiments, various other modifications and changes could be made therein by one skilled in the art without varying from the scope and spirit of the subject invention as defined by the appended claims.

I claim:

1. A security method for use in a transaction system which includes a central processor and a portable transaction device both having an internal memory, said security method for use in both on-line and off-line modes and comprising the steps of:
    generating a sequence of transaction numbers;
    generating a list of random numbers each of which is assigned to one of said transaction number thereby defining a table;
    storing said table at both the central processor and in the portable transaction device;
    assigning one of said transaction numbers to each transaction; and thereafter, during a transaction,
    generating a security code, at either said central processor or said portable transaction device, said security code being derived by combining data representative of a transaction parameter and the random number listed in said table that is associated with the particular transaction number assigned to the present transaction; and
    supplying the transaction parameter, transaction number and associated security code to the central processor or portable transaction device which did not initally generate the security code and verifying the transaction utilizing the received transaction parameter, security code and the random number associated with the received transaction number.

2. A security method as recited in claim 1 wherein the security code is generated at the central processor and verified at the portable transaction device.

3. A security method as recited in claim 1 wherein the security code is generated at the portable transaction device and verified at the central processor.

4. A security method as recited in claim 3 wherein the transaction numbers are successive check numbers and further including the step of placing the security code generated by the portable transaction device on the check.

5. A security method as recited in claim 4 further including the steps, performed at the central processor, of:
    receiving the check having the transaction number and security code placed thereon;
    retrieving from said table the random number associated with the transaction number;
    generating a security code by combining data from the check representative of said transaction parameter and the retrieved random number; and
    comparing the security code generated at the central processor with the security code on the check.

6. A security method as recited in claim 5 further including the steps of:
    authorizing the transaction if the security code generated at the central processor and the security code on the check match.

7. A security method as recited in claim 1 wherein said transaction parameter is the transaction amount.

8. A security method as recited in claim 7 further including the steps of:
    storing an account balance;
    comparing the transaction amount to the account balance; and
    debiting the account balance if the account balance is sufficient, but if the account balance is insufficient, halting the transaction.

9. A security method as recited in claim 1 further including the steps of:
    establishing an on-line connection between the portable transaction device and the central processor;
    generating a random offset number at the central processor;
    supplying the offset number to the portable transaction device; and
    incrementing the list of available random numbers stored in the portable transaction device and the central processor based on said offset number thereby altering the assignment of random numbers to transaction numbers.

10. A method as recited in claim 9 further including the steps of:
    supplying the last used transaction number used by the portable transaction device to the central processor; and
    incrementing the list of random numbers stored in the central processor based on the last used transaction number.

11. A combination on-line and off-line transaction system including a central processor and a portable transaction device both having an internal memory, said system comprising:
    means at said central processor for generating a sequence of transaction numbers, said means also for generating a list of random numbers each of which is assigned to one of said transaction numbers thereby defining a table;

means at said central processor for supplying said table to the portable transaction device for storage;

means in both said portable transaction device and central processor for independently generating a security code for each transaction, said security code being derived by assigning a transaction number to each transaction and then combining data representative of a transaction parameter with the random number listed in the table that is associated with the particular transaction number assigned to the transaction; and means for receiving the transaction parameter, transaction number and associated security code generated at either said central processor or said portable transaction device and supplied to the other, said means for verifying the transaction by comparing the received security code with a security code locally generated utilizing the received transaction parameter and the random number associated with the received transaction number.

12. A transaction system as recited in claim 11 wherein said comparison means in located at the portable transaction device.

13. A transaction device as recited in claim 11 wherein said comparison means is located at the central processor.

14. A transaction system as recited in claim 11 further including a means at the portable transaction device capable of placing the security code generated by the portable transaction device on a check.

15. A transaction system as recited in claim 11 further including a means at said central processor for generating a random offset number and supplying that random offset number directly to the portable transaction device when an on-line connection has been established therewith, such that the list of random numbers stored in both the portable transaction device and the central processor may be incremented based on the offset number thereby altering the assignment of random numbers to transaction numbers.

16. A transaction system as recited in claim 11 further including means at said portable transaction device for storing an account balance.

17. A transaction system as recited in claim 16 wherein the transaction parameter is the transaction amount and further including a means for comparing the transaction amount to the account balance and also for debiting the account balance if the funds therein are sufficient to cover the transaction, but if the account balance is insufficient, halting the transaction.

* * * * *